(12) United States Patent
Nagano

(10) Patent No.: US 11,868,784 B2
(45) Date of Patent: Jan. 9, 2024

(54) INFORMATION PROCESSING APPARATUS AND INFORMATION PROCESSING METHOD

(71) Applicant: DENSO CORPORATION, Kariya (JP)

(72) Inventor: Yuudai Nagano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/538,444

(22) Filed: Nov. 30, 2021

(65) Prior Publication Data

US 2022/0083346 A1 Mar. 17, 2022

Related U.S. Application Data

(63) Continuation of application No. PCT/JP2020/019289, filed on May 14, 2020.

(30) Foreign Application Priority Data

Jun. 3, 2019 (JP) ................................. 2019-103814

(51) Int. Cl.
*G06F 9/4401* (2018.01)

(52) U.S. Cl.
CPC ................... *G06F 9/4406* (2013.01)

(58) Field of Classification Search
None
See application file for complete search history.

(56) References Cited

U.S. PATENT DOCUMENTS

| 7,814,307 | B2 * | 10/2010 | Powell ............... G06F 9/45533 713/1 |
| 2006/0277400 | A1 * | 12/2006 | Veen ..................... G06F 9/4411 713/1 |
| 2012/0297177 | A1 * | 11/2012 | Ghosh .................. G06F 21/575 713/2 |
| 2017/0212793 | A1 | 7/2017 | Choi et al. |
| 2021/0096252 | A1 * | 4/2021 | Sasaki ..................... G01S 17/86 |

FOREIGN PATENT DOCUMENTS

JP 2011-039847 A 2/2011

\* cited by examiner

*Primary Examiner* — Fahmida Rahman
(74) *Attorney, Agent, or Firm* — Harness, Dickey & Pierce, P.L.C.

(57) ABSTRACT

In an information processing apparatus, a snapshot file corresponding to an application program is read from a non-volatile storage medium and the read snapshot file is loaded into a RAM. An operating system on which the application program operates is loaded into the RAM, and the operating system is started. The application program is read from the non-volatile storage medium after starting the operating system; the read application program is loaded into the RAM. The application program loaded in the RAM is started by using the snapshot file loaded in the RAM. Herein, reading the snapshot file from the non-volatile storage medium and loading the read snapshot file into the RAM are performed (i) before loading the operating system on which the application program operates into the RAM, or (ii) while performing a process of starting the operating system.

5 Claims, 3 Drawing Sheets

INFORMATION PROCESSING APPARATUS AND INFORMATION PROCESSING METHOD

CROSS REFERENCE TO RELATED APPLICATIONS

The present application is a continuation application of International Patent Application No. PCT/JP2020/019289 filed on May 14, 2020, which designated the U.S. and claims the benefit of priority from Japanese Patent Application No. 2019-103814 filed on Jun. 3, 2019. The entire disclosures of all of the above applications are incorporated herein by reference.

TECHNICAL FIELD

The present disclosure relates to an information processing apparatus and an information processing method.

BACKGROUND

A technique is known in which when starting an application (i.e., an application program), an information processing apparatus reads a snapshot file recording a previous working state of the application from a non-volatile storage medium and loads it into a RAM, thereby restoring the application in the previous working state. Starting an application or a program using a snapshot file recording a predetermined working state may be referred to as a resume startup or a resume function. There is disclosed a technique to load a snapshot file into a RAM, and then execute an application of which restoration information has been recorded by the snapshot file.

SUMMARY

According to an example of the present disclosure, an information processing apparatus is provided as follows. A snapshot file corresponding to an application program is read from a non-volatile storage medium and the read snapshot file is loaded into a RAM. An operating system on which the application program operates is loaded into the RAM, and the operating system is started. The application program is read from the non-volatile storage medium after starting the operating system; the read application program is loaded into the RAM. The application program loaded in the RAM is started by using the snapshot file loaded in the RAM. Herein, reading the snapshot file from the non-volatile storage medium and loading the read snapshot file into the RAM are performed (i) before loading the operating system on which the application program operates into the RAM, or (ii) while performing a process of starting the operating system.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Figure 1:
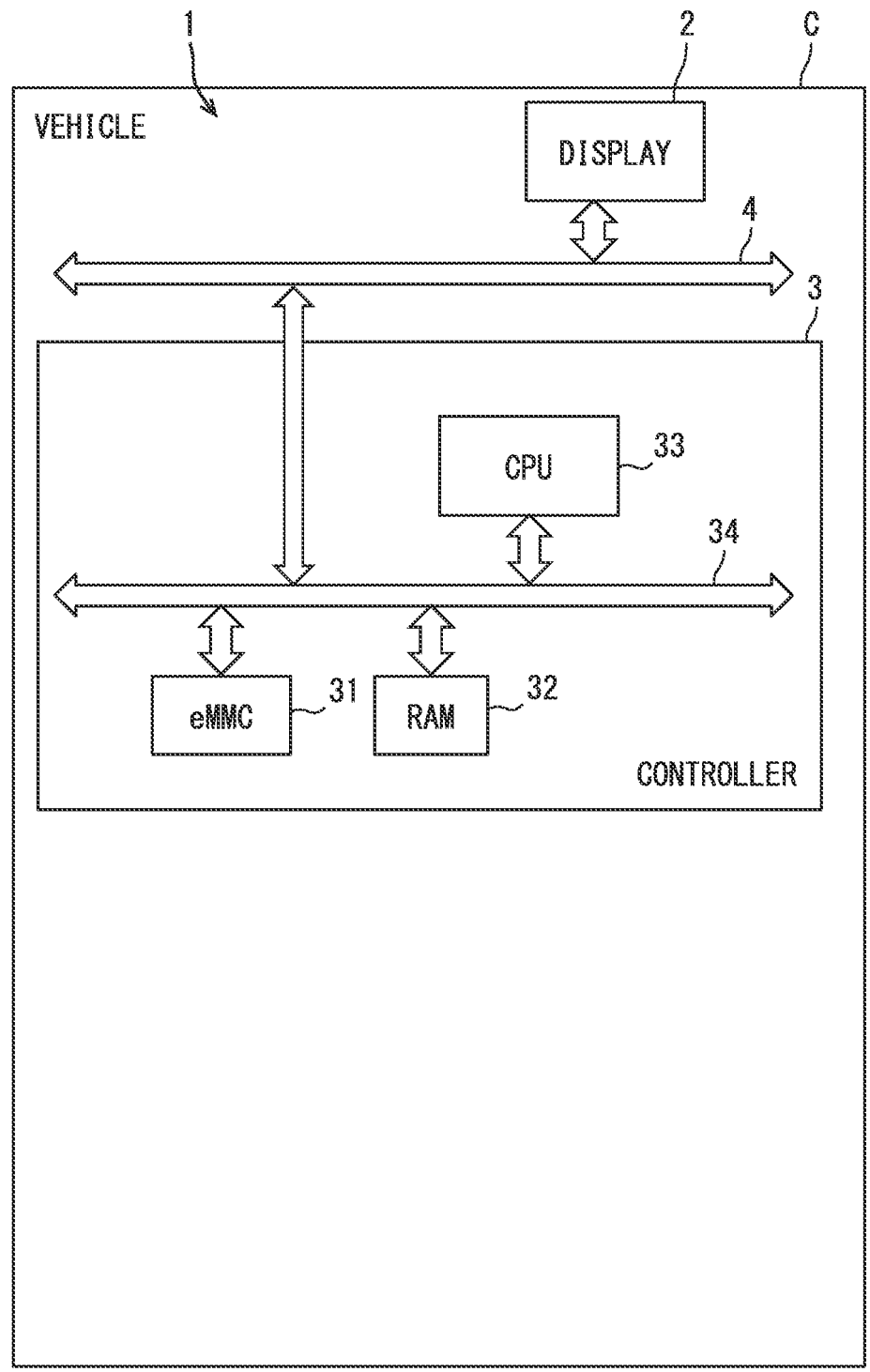
FIG. 1 is a configuration diagram of an in-vehicle display system.

The following will describe an embodiment of the present disclosure with reference to the drawings. FIG. 1 is a configuration diagram of an in-vehicle display system 1. The in-vehicle display system 1 is mounted on a vehicle C. The in-vehicle display system 1 includes a display device 2 and a controller unit 3 which is an information processing apparatus. The display device 2 may also be referred to as a display 2. The controller unit 3 may also be referred to as a controller 3.

The display device 2 and the controller unit 3 are connected to an in-vehicle LAN bus 4. The display device 2 and the controller unit 3 can transmit and receive signals to and from each other via the in-vehicle LAN bus 4. Further, the controller unit 3 can transmit and receive signals to and from various devices mounted on the vehicle C via the in-vehicle LAN bus 4. The signal received by the controller unit 3 via the in-vehicle LAN bus 4 include signals indicating the current states in the vehicle instruments displayed as an image on the display device 2. These signals include a signal indicating the vehicle speed, a signal indicating the remaining fuel amount, and the like. The display device 2 is arranged at a position that can be visually recognized by the occupant in the passenger compartment of the vehicle C. The display device 2 can display various images. The display device 2 uses a liquid crystal display, an organic EL display, or the like.

As shown in FIG. 1, the controller unit 3 includes an eMMC (embedded Multi Media Card) 31, a RAM 32, a CPU 33, and a bus 34. The eMMC 31, RAM 32, and CPU 33 are connected to each other by the bus 34.

Figure 2:
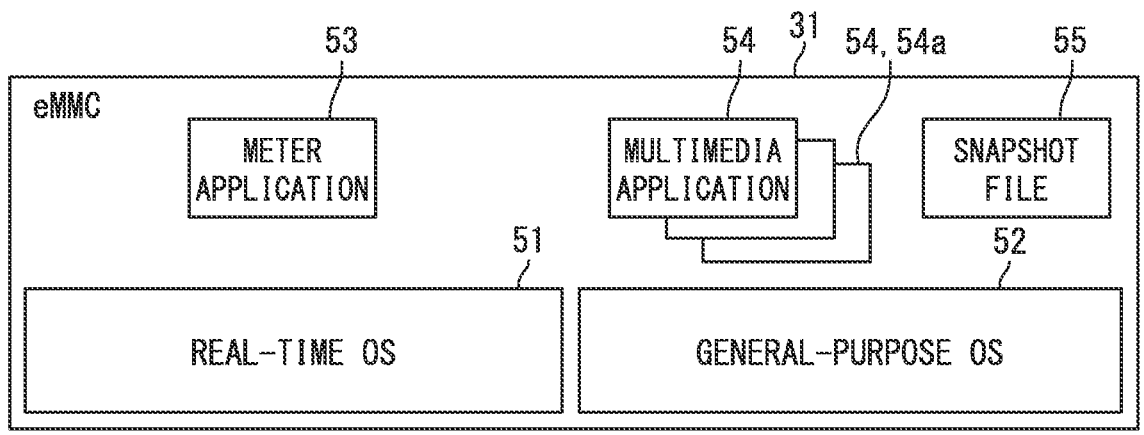
FIG. 2 is a diagram showing programs and a file stored in an eMMC.

The eMMC 31 is a writable non-volatile storage medium. The eMMC 31 is configured to include a flash memory. The programs and file shown in FIG. 2 are stored in the eMMC 31.

Specifically, the eMMC 31 stores two OS programs of a real-time operating system 51 (hereinafter, real-time OS 51) and a general-purpose operating system 52 (hereinafter, general-purpose OS 52). Further, as an application program (hereinafter, simply an application), a meter application 53 and a plurality of multimedia applications 54 are also stored. The snapshot file 55 is also stored in the eMMC 31.

The real-time OS 51 is an operating system that performs real-time processing. Compared with the general-purpose OS 52, the real-time OS 51 is excellent in stability and has a feature that the time required for startup is short.

The general-purpose OS 52 is an OS capable of executing more complicated functions than the real-time OS 51. On the other hand, the general-purpose OS 52 is less stable than the real-time OS 51, and it takes time to start up.

The meter application 53 is a travel-related display application program, and is an application that causes the CPU 33 to function as a travel-related display unit. When the meter application 53 is executed and the CPU 33 functions as a travel-related display unit, the CPU 33 causes the display device 2 to display an image related to the travel of the vehicle C. The image related to the travel of the vehicle C is, for example, an image showing a traveling speed meter of the vehicle C. The meter application 53 is an application that operates on the real-time OS 51.

The meter application 53 also has a function of causing the CPU 33 to execute a process of drawing a part of the startup screen image on the display device 2. Since the meter application 53 operates on the real-time OS 51 that is started before the general-purpose OS 52, the startup is completed quickly. Therefore, since the meter application 53 has a function of drawing the startup screen image on the display device 2, it is possible to quickly start drawing the startup screen image on the display device 2.

There is no limit to the number of multimedia applications 54. The number of multimedia applications 54 may be one or several. The multimedia application 54 is an application that operates or runs on the general-purpose OS 52. The multimedia application 54 includes a route guidance application, an audio reproduction application, a video reproduction application, and a weather forecast application, for instance.

The multimedia application 54 also includes a startup screen image drawing application 54a that causes the CPU 33 to execute a process of causing the display device 2 to draw the remaining part of the startup screen image. The remaining part of the startup screen image is a remaining part of the startup screen image other than a part of the startup screen image drawn by the CPU 33 executing the meter application 53. The startup screen image drawing application 54a may be a part of another multimedia application 54 such as a route guidance application.

The snapshot file 55 is a file that stores restoration information (e.g., a predetermined working state) used for starting a corresponding application. The corresponding application can re-start (i.e., resume) from the predetermined working state (e.g., the state before the termination). The snapshot file 55 is created for each type of multimedia application 54 and stored in the eMMC 31. The snapshot file 55 is created by the CPU 33 at an appropriate timing such as when the processing of the controller unit 3 is completed. In this embodiment, the snapshot file 55 is created for at least the startup screen image drawing application 54a.

Return to the description of FIG. 1. The RAM 32 is a temporary storage device used when the CPU 33 executes a program stored in the eMMC 31. Further, when the CPU 33 executes the program stored in the eMMC 31, the program is loaded into the RAM 32. The snapshot file 55 is also loaded into the RAM 32.

The CPU 33, which is a processor, executes a program stored in the eMMC 31. Therefore, the CPU 33 executes two OSs, a real-time OS 51 and a general-purpose OS 52. The CPU 33 also executes the meter application 53 and the multimedia application 54. When executing these programs, the CPU 33 accesses the eMMC 31 and loads the program to be executed into the RAM 32. After that, the CPU 33 executes the startup process using the program loaded in the RAM 32. By terminating the startup process, the CPU 33 can execute the function specified by the program.

Figure 3:
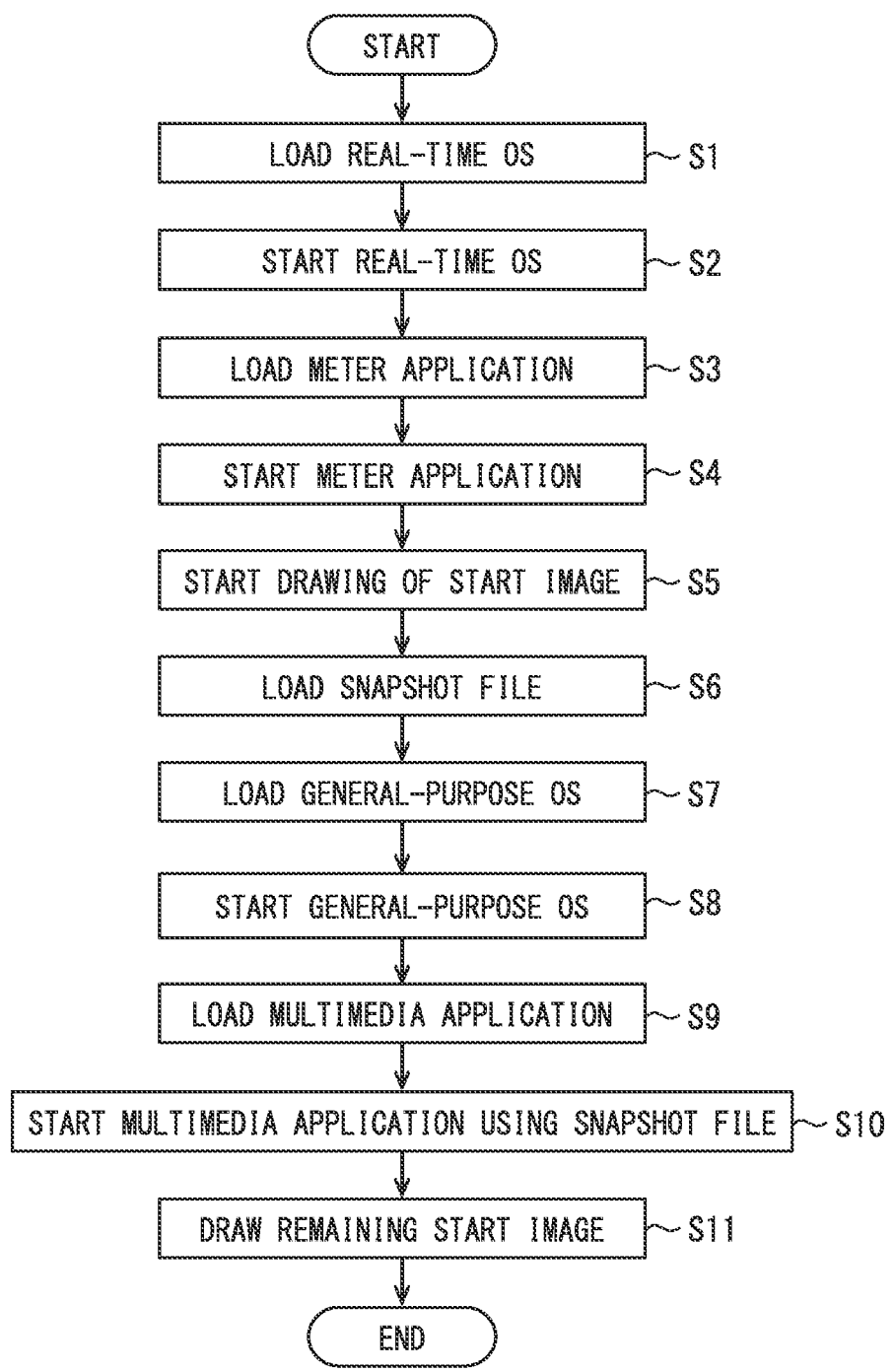
FIG. 3 is a flowchart showing a process executed by a CPU when a controller unit is started.

FIG. 3 shows a process executed by the CPU 33 when the controller unit 3 is started. It can be said that the process shown in FIG. 3 indicates an information processing method executed by the controller unit 3. At startup, the CPU 33 executes a program for executing steps S1 and S2 (hereinafter, steps are omitted). This program is, for example, a boot loader. The boot loader may be stored in the eMMC 31, or may be stored in an internal storage medium included in the CPU 33.

In S1, the real-time OS 51 is loaded into the RAM 32. In the following S2, the real-time OS 51 is started by using the real-time OS 51 loaded in the RAM 32. After the startup process of the real-time OS 51 is completed, S3 is executed.

S3 to S4 are functions that the real-time OS 51 causes the CPU 33 to execute. In other words, S3 to S4 are functions realized by the CPU 33 executing the real-time OS 51. In S3, the meter application 53 is loaded into the RAM 32. In S4, the meter application 53 loaded in the RAM 32 is used to start the meter application 53. After the startup process of the meter application 53 is completed, S5 is executed.

S5 is a function that the meter application 53 causes the CPU 33 to execute. In S5, the display device 2 starts drawing a part of the startup images assigned as the drawing function by the meter application 53.

S6 is a function that the real-time OS 51 causes the CPU 33 to execute. The processing of S6 may be performed in parallel with the processing of S5. In S6, the snapshot file 55 is read from the eMMC 31 and loaded into the RAM 32. Therefore, the real-time OS 51 functions as a read program.

S7 and S8 may be a function that the real-time OS 51 causes the CPU 33 to execute, or may be a function that a program other than the real-time OS 51, such as a boot loader, causes the CPU 33 to execute.

In S7, the general-purpose OS 52 is loaded into the RAM 32. In S8, the general-purpose OS 52 loaded in the RAM 32 is used to start the general-purpose OS 52. After the startup process of the general-purpose OS 52 is completed, S9 is executed.

S9 and S10 are functions that the general-purpose OS 52 causes the CPU 33 to execute. In S9, the multimedia application 54 is loaded into the RAM 32. In S10, the startup process (i.e., resume startup) of starting the multimedia application 54 is performed by using the multimedia application 54 loaded in the RAM 32 in S9 and the snapshot file 55 loaded in the RAM 32 in S6.

S11 is a function that, of a plurality of multimedia applications 54, the multimedia application 54 corresponding to the snapshot file 55 causes the CPU 33 to execute. In S11, the image of the remaining part of the startup image is drawn on the display device 2. The image of the remaining part of the startup image is an image other than the part of the startup image drawn by the meter application 53.

Outline of Embodiment

In the present embodiment described above, the general-purpose OS 52 on which the multimedia application 54 operates does not have a function of loading the snapshot file 55 into the RAM 32. The real-time OS 51, which operates on the CPU 33 before the startup of the general-purpose OS 52, has the function of loading the snapshot file 55 into the RAM 32.

The real-time OS 51 causes the CPU 33 to load the snapshot file 55 for the corresponding multimedia application 54 into the RAM 32 in S6 before the startup of the general-purpose OS 52 is completed, that is, before the processing of S8 is completed.

Therefore, the period during which the multimedia application 54 is loaded into the RAM 32 (that is, the period during which S9 is executed) and the period during which the snapshot file 55 is loaded into the RAM 32 (that is, the period during which S6 is executed) do not overlap with each other.

If the general-purpose OS 52 that executes the multimedia application 54 is provided with a function of loading the snapshot file 55 into the RAM 32, the period for loading the snapshot file 55 into the RAM 32 is always after the startup of the general-purpose OS 52. In that case, the period for loading the multimedia application 54 into the RAM 32 and the period for loading the snapshot file 55 into the RAM 32 may overlap with each other. When these periods overlap, the periods during which the multimedia application 54 and the snapshot file 55 pass through the bus 34 for being transferred from the eMMC 31 to the RAM 32 overlap. However, there is an upper limit to the communication speed of the bus 34. Therefore, if the periods during which the multimedia application 54 and the snapshot file 55 pass through the bus 34 overlap, there is a possibility that a waiting time may occur during data transfer.

However, in the present embodiment, as described above, the period during which the multimedia application 54 is loaded into the RAM 32 and the period during which the snapshot file 55 is loaded into the RAM 32 do not overlap. Therefore, the waiting time for data transfer using the bus 34 can be reduced. Therefore, the startup process (S10) of the multimedia application 54 with the snapshot file can be completed quickly.

In particular, in the present embodiment, the time at which the CPU 33 loads the snapshot file 55 into the RAM 32 is after the startup process (S2) of the real-time OS 51 is completed and before the startup process (S8) of the general-purpose OS 52 is started. In this case, as compared with the case where the CPU 33 loads the snapshot file 55 into the RAM 32 in parallel while executing the startup process (S8) of the general-purpose OS 52, the processing load of the CPU 33 when the snapshot file 55 is loaded into the RAM 32 can be reduced.

The in-vehicle display system 1 of the present embodiment has a function of executing the meter application 53 and the multimedia application 54. The meter application 53 needs to be started and completed promptly when the power state of the vehicle C becomes the accessory ON state or the ignition ON state. Therefore, the meter application 53 operates on the real-time OS 51 that can be started quickly.

On the other hand, with such a configuration, the completion of startup of the multimedia application 54 using the snapshot file may be delayed. This is because the startup processing of the general-purpose OS 52 and the multimedia application 54 is not started until the startup processing of the meter application 53 is completed. However, in the present embodiment, the snapshot file 55 is loaded into the RAM 32 before the startup or booting of the general-purpose OS 52 on which the multimedia application 54 operates is completed. Therefore, it is possible to suppress the delay in completing the startup of the multimedia application 54 using the snapshot file.

Further, in the present embodiment, the real-time OS 51 has a function of loading the snapshot file 55 into the RAM 32. The real-time OS 51 operates separately from the general-purpose OS 52 on which the multimedia application 54 operates. Utilizing such a configuration, the snapshot file 55 can be loaded into the RAM 32 before the booting or startup of the general-purpose OS 52 is completed.

Further, in the present embodiment, the CPU 33 also loads the meter application 53 into the RAM 32. The time at which the CPU 33 executes the real-time OS 51 and loads the snapshot file 55 into the RAM 32 is after the start process (S4) of the meter application 53 is completed, and before the process (S7) of loading the general-purpose OS 52 into the RAM is started. Therefore, in this case, the processing load of the CPU 33 when the snapshot file 55 is loaded into the RAM 32 can be reduced as compared with the case where the CPU 33 loads the snapshot file 55 into the RAM 32 in parallel during the execution of S4.

Further, in the present embodiment, the meter application 53 has a function of causing the CPU 33 to execute a process of drawing a part of the startup image on the display device 2. By doing so, the load on the CPU 33 at the time of drawing by the meter application 53 is reduced as compared with the case where the meter application 53 causes the CPU 33 to execute the process of drawing the entire startup image. As a result, many resources of the CPU 33 can be allocated to start the general-purpose OS 52 even during drawing by the meter application 53. Therefore, the general-purpose OS 52 can be started quickly. In addition, the snapshot file 55 is loaded into the RAM 32 before the general-purpose OS 52 is loaded into the RAM 32. As a result, the startup process of the multimedia application 54 using the snapshot file is quickly completed. Therefore, even if the multimedia application 54 in which the snapshot file 55 is stored causes the CPU 33 to execute the process of drawing the remaining part of the startup image, the entire startup screen image is smoothly drawn.

Although the embodiment has been described above, the disclosed technology is not limited to the above-described embodiment, and the following modification examples are included in the present disclosure, and various modification examples can be made without departing from the spirit of the present disclosure. In the following description, elements having the same reference numerals as those used so far are the same as elements having the same reference numerals in the previous embodiments, except when specifically described. When only a part of the configuration is described, the embodiment described above can be applied to other parts of the configuration.

First Modification Example

In the above embodiment, the snapshot file 55 is loaded into the RAM 32 before the process (S7) of loading the general-purpose OS 52 into the RAM 32 is executed. However, after loading the general-purpose OS 52 into the RAM 32, the snapshot file 55 may be loaded into the RAM 32 while the startup process (S8) of the general-purpose OS 52 is being executed. The usage rate of the bus 34 is low even during the startup process of the general-purpose OS 52. Therefore, even in this way, when the snapshot file 55 is loaded into the RAM 32, the waiting time for using the bus 34 can be reduced.

Second Modification Example

In the above embodiment, the real-time OS 51 has a function of loading the snapshot file 55 into the RAM 32. However, the program having the function of loading the snapshot file 55 into the RAM 32 is not limited to the real-time OS 51. The program having a function of loading the snapshot file 55 into the RAM 32 may be a program that can operate before the general-purpose OS 52 is loaded into the RAM 32. For example, a program having a function of loading the snapshot file 55 into the RAM 32 may be a boot loader. Further, the program having a function of loading the snapshot file 55 into the RAM 32 may be a program operating on the real-time OS 51.

Third Modification Example

In the above embodiment, the snapshot file 55 and the multimedia application 54 are stored in the eMMC 31. However, the snapshot file 55 and the multimedia application 54 may be stored in another non-volatile storage medium, for example, an SSD (Solid State Drive).

For reference to further explain features of the present disclosure, the description is added as follows.

A technique is known in which when starting an application (i.e., an application program), an information processing apparatus reads a snapshot file recording a previous working state of the application from a non-volatile storage medium and loads it into a RAM, thereby restoring the application in the previous working state. Starting an application or a program using a snapshot file recording a predetermined working state may be referred to as a resume startup or a resume function. There is disclosed a technique to load a snapshot file into a RAM, and then execute an application of which restoration information has been recorded by the snapshot file.

A non-volatile storage medium typically stores both a snapshot file and a corresponding application. When the information processing apparatus is started, the application is also read from the non-volatile storage medium and loaded into the RAM, in addition to the snapshot file.

Therefore, there is a possibility that the period for loading the application from the non-volatile storage medium into the RAM for starting the application overlaps with the period for loading the snapshot file from the non-volatile storage medium into the RAM.

The RAM and the non-volatile storage medium are connected by a bus, and there is an upper limit to the speed at which the bus transfers data. As described above, there may be an overlapping case where the period for loading the application from the non-volatile storage medium into the RAM overlaps with the period for loading the snapshot file from the non-volatile storage medium into the RAM. In such an overlapping case, there is a possibility that the waiting time for using the bus becomes long; thereby the completion of the startup of the application using the snapshot file may be delayed.

It is thus desired for the present disclosure to provide an information processing apparatus and an information processing method capable of promptly starting an application.

An aspect of the present disclosure described herein is set forth in the following clauses.

According to an aspect of the present disclosure, an information processing apparatus is provided to include a writable non-volatile storage medium, a RAM, a processor, a bus, an operating system, and a read program. The writable non-volatile storage medium is configured to store an application program and a snapshot file. The RAM is configured to be loaded with the snapshot file and the application program. The processor is configured to load the application program from the non-volatile storage medium into the RAM and execute the application program. The bus is configured to connect the non-volatile storage medium, the RAM, and the processor with each other. The operating system is configured to cause the processor to (i) load the application program from the non-volatile storage medium into the RAM and (ii) execute the application program. The read program is configured to cause the processor to read the snapshot file from the non-volatile storage medium and load the read snapshot file into the RAM, (i) before the operating system is loaded into the RAM or (ii) while the processor is performing a process of starting the operating system. In this information processing apparatus, the operating system on which the application program operates does not have the function of loading the snapshot file into the RAM. Instead, a read program, which operates on the processor before the operating system starts, has the above function of loading the snapshot file into the RAM.

The read program causes the processor to load the snapshot file into the RAM before the operating system is loaded into the RAM or while the processor is executing a process of starting the operating system.

Therefore, the period during which the application program or the operating system is loaded into the RAM does not overlap with the period during which the snapshot file is loaded into the RAM. This can reduce the waiting time when using the bus to load these programs and file from the non-volatile storage medium into the RAM. By reducing the waiting time, the startup of the application program with the snapshot file can be completed quickly.

According to another aspect of the present disclosure, a computer-implemented information processing method is provided for an information processing apparatus to start an application program. The information processing method is performed by a processor. The method includes: (i) reading a snapshot file from a writable non-volatile storage medium configured to store an application program and the snapshot file and loading the read snapshot into a RAM, (a) before loading an operating system on which the application program operates into the RAM, or (b) while executing a process of starting the operating system; (ii) loading the application program into the RAM after executing the process of starting the operating system; and (iii) starting the application program loaded in the RAM by using the snapshot file loaded in the RAM.

What is claimed is:

1. An information processing apparatus comprising:
a processor;
a RAM;
a writable non-volatile storage medium configured to store an application program and a snapshot file corresponding to the application program;
a bus connecting the processor, the RAM, and the non-volatile storage medium with each other;
an operating system configured to cause the processor to (i) load the application program from the non-volatile storage medium into the RAM and (ii) start the application program; and
a read program configured to cause the processor to read the snapshot file from the non-volatile storage medium and load the read snapshot file into the RAM, (i) before the operating system is loaded into the RAM or (ii) before the application program is loaded into the RAM and while a process of starting the operating system is being performed,
wherein
the snapshot file is used when the application program is started after the operating system is started;
the information processing apparatus is configured to display an image on a display device mounted on a vehicle;
the operating system is a general-purpose operating system, the application program is a multimedia application program that operates on the general-purpose operating system, and the snapshot file corresponds to the multimedia application program;
the non-volatile storage medium is configured to store a real-time operating system executed by the processor, the general-purpose operating system executed by the processor, a driving-related display application program that operates on the real-time operating system to display an image related to driving of the vehicle on the display device, and the multimedia application program that operates on the general-purpose operating system;
loading the general-purpose operating system into the RAM is started after a process of starting the real-time operating system is completed;
the read program is included in the real-time operating system; and
the processor is configured to execute the real-time operating system to read the snapshot file from the non-volatile storage medium and load the snapshot file into the RAM, after completing a process of starting the driving-related display application program and before starting loading the general-purpose operating system into the RAM.

2. The information processing apparatus according to claim 1, wherein:
   the driving-related display application program includes a function of causing the processor to execute drawing a part of a startup image on the display device; and
   the multimedia application program in which the snapshot file is stored includes a function of causing the processor to execute drawing a remaining part of the startup image on the display device.

3. An information processing apparatus for displaying an image on a display device mounted on a vehicle, the information processing apparatus comprising:
   a processor;
   a RAM;
   a writable non-volatile storage medium configured to store a multimedia application program, a snapshot file corresponding to the multimedia application program, and a driving-related display application program configured to display an image related to driving of the vehicle on the display device;
   a bus connecting the processor, the RAM, and the non-volatile storage medium with each other;
   a second operating system configured to cause the processor to (i) load the multimedia application program from the non-volatile storage medium into the RAM and (ii) start the multimedia application program;
   a read program configured to cause the processor to read the snapshot file from the non-volatile storage medium and load the read snapshot file into the RAM, (i) before the second operating system is loaded into the RAM or (ii) while a process of starting the second operating system is being performed; and
   a first operating system being a real-time operating system configured to cause the processor to (i) load the driving-related display application program from the non-volatile storage medium into the RAM and (ii) start the driving-related display application program,
   wherein:
   loading the second operating system into the RAM is started after a process of starting the first operating system is completed;
   the information processing apparatus is configured to display the image on the display device mounted on the vehicle;
   the second operating system is a general-purpose operating system, the multimedia application program operates on the general-purpose operating system, and the snapshot file corresponds to the multimedia application program;
   the driving-related display application program operates on the real-time operating system to display the image related to driving of the vehicle on the display device;
   loading the general-purpose operating system into the RAM is started after a process of starting the real-time operating system is completed;
   the read program is included in the real-time operating system; and
   the processor is configured to execute the real-time operating system to read the snapshot file from the non-volatile storage medium and load the snapshot file into the RAM, after completing a process of starting the driving-related display application program and before starting loading the general-purpose operating system into the RAM.

4. A computer-implemented information processing method for an information processing apparatus to start an application program, the information processing method being performed by a processor, the information processing method comprising:
   reading a snapshot file corresponding to the application program from a writable non-volatile storage medium and loading the read snapshot file into a RAM;
   loading an operating system on which the application program operates, into the RAM, and starting the operating system without using the snapshot file;
   reading, after starting the operating system, the application program from the non-volatile storage medium and loading the read application program into the RAM; and
   starting the application program loaded in the RAM by using the snapshot file loaded in the RAM,
   wherein:
   reading the snapshot file from the non-volatile storage medium and loading the read snapshot file into the RAM are performed by the processor (i) before loading the operating system on which the application program operates into the RAM, or (ii) while performing a process of starting the operating system;
   the information processing apparatus is configured to display an image on a display device mounted on a vehicle;
   the operating system is a general-purpose operating system, the application program is a multimedia application program that operates on the general-purpose operating system, and the snapshot file corresponds to the multimedia application program;
   the writable non-volatile storage medium is configured to store a real-time operating system executed by the processor, the general-purpose operating system executed by the processor, a driving-related display application program that operates on the real-time operating system to display the image related to driving of the vehicle on the display device, and the multimedia application program that operates on the general-purpose operating system;
   loading the general-purpose operating system into the RAM is started after a process of starting the real-time operating system is completed;
   the read program is included in the real-time operating system; and
   the method further comprises executing, with the processor, the real-time operating system to read the snapshot file from the non-volatile storage medium and load the snapshot file into the RAM, after completing a process of starting the driving-related display application program and before starting loading the general-purpose operating system into the RAM.

5. A computer-implemented information processing method for an information processing apparatus to display an image on a display device mounted on a vehicle by starting (i) a travel-related display application program to display an image related to a travel of the vehicle and (ii) a multimedia application program, the information processing method being performed by a processor, the information processing method comprising:

reading a snapshot file corresponding to the multimedia application program from a writable non-volatile storage medium and loading the read snapshot file into a RAM;

loading a first operating system being a real-time operating system on which the travel-related display application program operates, into the RAM, and starting the first operating system;

loading, after completing starting the first operating system, a second operating system being a general-purpose operating system on which the multimedia application program operates, into the RAM, and staring the second operating system;

reading, after completing starting the second operating system, the multimedia application program from the non-volatile storage medium and loading the read multimedia application program into the RAM; and starting the multimedia application program loaded in the RAM by using the snapshot file loaded in the RAM, wherein:

reading the snapshot file from the non-volatile storage medium and loading the read snapshot file into the RAM are performed by the processor (i) before loading the second operating system on which the multimedia application program operates into the RAM, or (ii) while performing a process of starting the second operating system;

the non-volatile storage medium is configured to store the real-time operating system, the general-purpose operating system, the travel-related display application program that operates on the real-time operating system to display an image related to travel of the vehicle on the display device, and the multimedia application program that operates on the general-purpose operating system;

loading the general-purpose operating system into the RAM is started after a process of starting the real-time operating system is completed; and the information processing method further comprising executing the real-time operating system to read the snapshot file from the non-volatile storage medium and load the snapshot file into the RAM, after completing a process of starting the travel-related display application program and before starting loading the general-purpose operating system into the RAM.

\* \* \* \* \*